(12) United States Patent
Bonagiri et al.

(10) Patent No.: US 12,026,522 B2
(45) Date of Patent: Jul. 2, 2024

(54) AUTOMATIC APPLICATION DEPENDENCY MANAGEMENT

(71) Applicant: International Business Machines Corporation, Armonk, NY (US)

(72) Inventors: Krishna Kishore Bonagiri, East Godavari (IN); Namit Kabra, Hyderabad (IN); Yannick Saillet, Stuttgart (DE); Mike W. Grasselt, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 17/223,065

(22) Filed: Apr. 6, 2021

(65) Prior Publication Data

US 2022/0318028 A1 Oct. 6, 2022

(51) Int. Cl.
| G06F 9/24 | (2006.01) |
| G06F 9/30 | (2018.01) |
| G06F 9/445 | (2018.01) |
| H04L 9/06 | (2006.01) |
| G06F 9/4401 | (2018.01) |
| H04L 9/00 | (2022.01) |

(52) U.S. Cl.
CPC ...... G06F 9/44505 (2013.01); G06F 9/30007 (2013.01); G06F 9/44536 (2013.01); H04L 9/0643 (2013.01); G06F 9/4401 (2013.01); H04L 9/50 (2022.05)

(58) Field of Classification Search
CPC ............. G06F 9/44505; G06F 9/30007; G06F 9/44536; G06F 8/36; G06F 9/45533; G06F 8/65; G06F 8/71; H04L 9/0643; H04L 9/50; H04L 9/3297

USPC ............................................................ 713/1
See application file for complete search history.

(56) References Cited

U.S. PATENT DOCUMENTS

| 9,383,989 B1 * | 7/2016 | Qi ............................. G06F 8/65 |
| 9,535,685 B1 * | 1/2017 | Wang ......................... G06F 8/61 |
| 10,248,414 B2 | 4/2019 | Oberheide et al. |
| 10,613,849 B2 | 4/2020 | Pirzadeh et al. |
| 10,884,762 B1 * | 1/2021 | Truong ............... G06F 11/1469 |
| 2009/0182794 A1 * | 7/2009 | Sekiguchi ........... G06F 11/0775 714/39 |
| 2013/0086256 A1 * | 4/2013 | Sasatani ................. H04L 67/12 709/224 |
| 2016/0335161 A1 * | 11/2016 | Toeroe ................ G06F 11/3051 |

(Continued)

OTHER PUBLICATIONS

Nandi et al., "Anomaly Detection Using Program Control Flow Graph Mining from Execution Logs", KDD '16, Aug. 13-17, 2016, 10 pgs.

*Primary Examiner* — Volvick Derose
(74) *Attorney, Agent, or Firm* — David K. Mattheis

(57) ABSTRACT

A database of deployed configurations, as well as attempted configurations that failed is maintained and used as reference to compare against configurations of attempted software deployments. Upon detecting a failed deployment, disclosed embodiments search the database for working configurations that most closely resemble the failed configuration, and rank the configurations based on various criteria. Disclosed embodiments may then automatically select a highest ranked working configuration, and perform an automatic upgrade of the necessary components to create a working configuration.

20 Claims, 12 Drawing Sheets

(56) References Cited

U.S. PATENT DOCUMENTS

| | | | |
|---|---|---|---|
| 2017/0068588 A1* | 3/2017 | Pourali | H04L 41/0836 |
| 2017/0201415 A1* | 7/2017 | Radhakrishnan | H04L 67/1097 |
| 2018/0088924 A1* | 3/2018 | Pirzadeh | G06F 8/65 |
| 2018/0260214 A1* | 9/2018 | Oberheide | G06F 16/2455 |
| 2019/0286624 A1* | 9/2019 | Chandrashekar | H04L 41/0856 |
| 2020/0133688 A1* | 4/2020 | Shinde | G06F 9/45558 |
| 2020/0349133 A1* | 11/2020 | Dwarampudi | G06F 16/2358 |
| 2021/0083945 A1* | 3/2021 | Bitterfeld | G06F 16/355 |
| 2021/0320836 A1* | 10/2021 | Leibkowiz | H04L 41/0631 |
| 2022/0247769 A1* | 8/2022 | Erlingsson | H04L 67/535 |
| 2022/0300297 A1* | 9/2022 | Cieslak | G06V 40/165 |
| 2023/0347576 A1* | 11/2023 | Michielsen | B29C 64/40 |

\* cited by examiner

```
...
INFO: Logger Name:                                              — 302
com.application.corejava.util.logging.ParseClassify
Jun 08, 2021 1:19:31 PM
com.application.corejava.util.logging.ParseClassify main
WARNING: Can cause ArrayIndexOutOfBoundsException               — 304
Jun 08, 2021 1:19:31 PM
com.application.corejava.util.logging.ParseClassify main
ERROR: Exception_Occured                                        — 306
       308   310
java.lang.ArrayIndexOutOfBoundsException:
ParseClassify.main(ParseClassify.java:22)
                   312                  314
...
```

FIG. 3

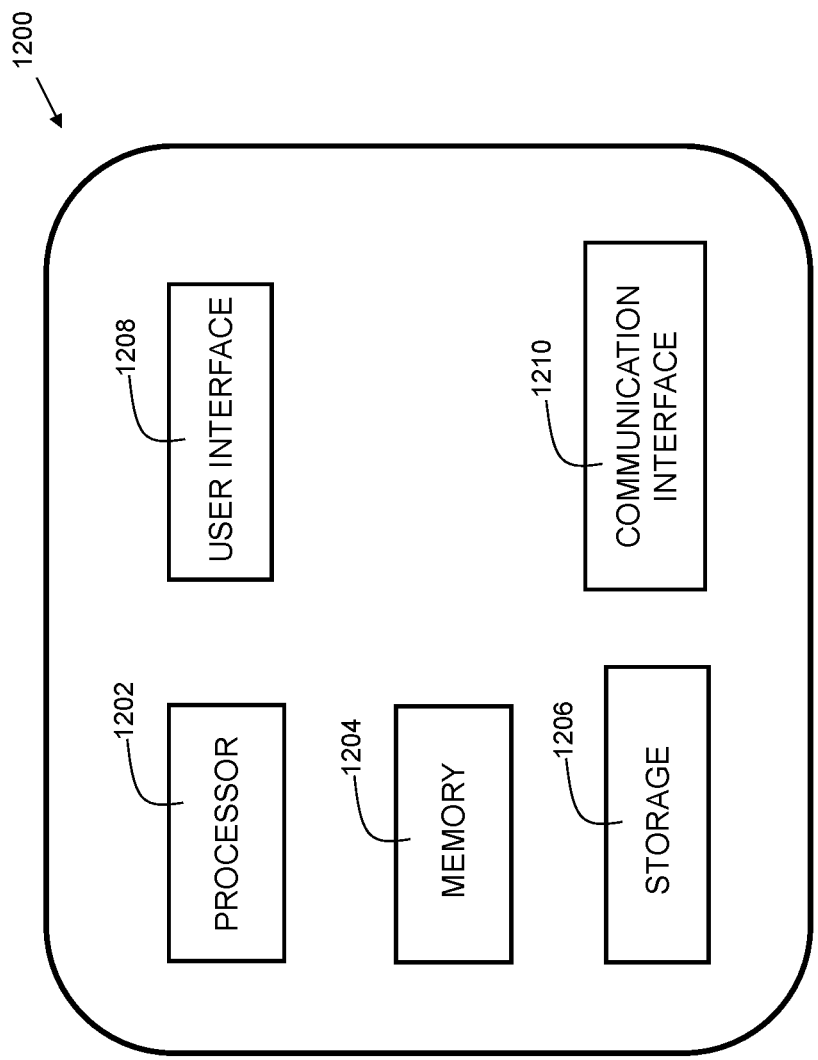

AUTOMATIC APPLICATION DEPENDENCY MANAGEMENT

FIELD

Disclosed embodiments relate generally to computer application deployment, and more particularly, to automatic application dependency management.

BACKGROUND

Component software techniques have been developed to facilitate software reuse. State and functionality are encapsulated inside components with the goal of reducing program errors due to hard-coded interactions between components. Late binding of components allows implementations to be chosen at run-time, thereby increasing opportunities for reuse. Component infrastructures can provide version management capabilities to control the evolutionary development of components. Beyond the general goal of reuse, component software has also focused on enabling distributed computing. Current component infrastructures have strong support for distributed applications. Multiple components can be combined to create applications. These multiple-component applications serve important functions in a variety of enterprises, such as business, education, government, and others.

SUMMARY

In one embodiment, there is provided a computer-implemented method comprising: determining an operational state of a multiple-component software system; in response to determining the operational state as working: searching for a matching configuration in a configuration database; and in response to finding the matching configuration, incrementing a counter corresponding to the matching configuration.

In another embodiment, there is provided an electronic computation device comprising: a processor; a memory coupled to the processor, the memory containing instructions, that when executed by the processor, cause the electronic computation device to: determine an operational state of a multiple-component software system; in response to determining the operational state as working: search for a matching configuration in a configuration database; and in response to finding the matching configuration, incrementing a counter corresponding to the matching configuration.

In another embodiment, there is provided a computer program product for an electronic computation device comprising a computer readable storage medium having program instructions embodied therewith, the program instructions executable by a processor to cause the electronic computation device to: determine an operational state of a multiple-component software system; in response to determining the operational state as working: search for a matching configuration in a configuration database; and in response to finding the matching configuration, incrementing a counter corresponding to the matching configuration.

BRIEF DESCRIPTION OF THE DRAWINGS

FIG. 3 shows an exemplary application log information used in accordance with embodiments of the present invention.

FIG. 12 is a block diagram of a client device used in accordance with embodiments of the present invention.

Figure 1:
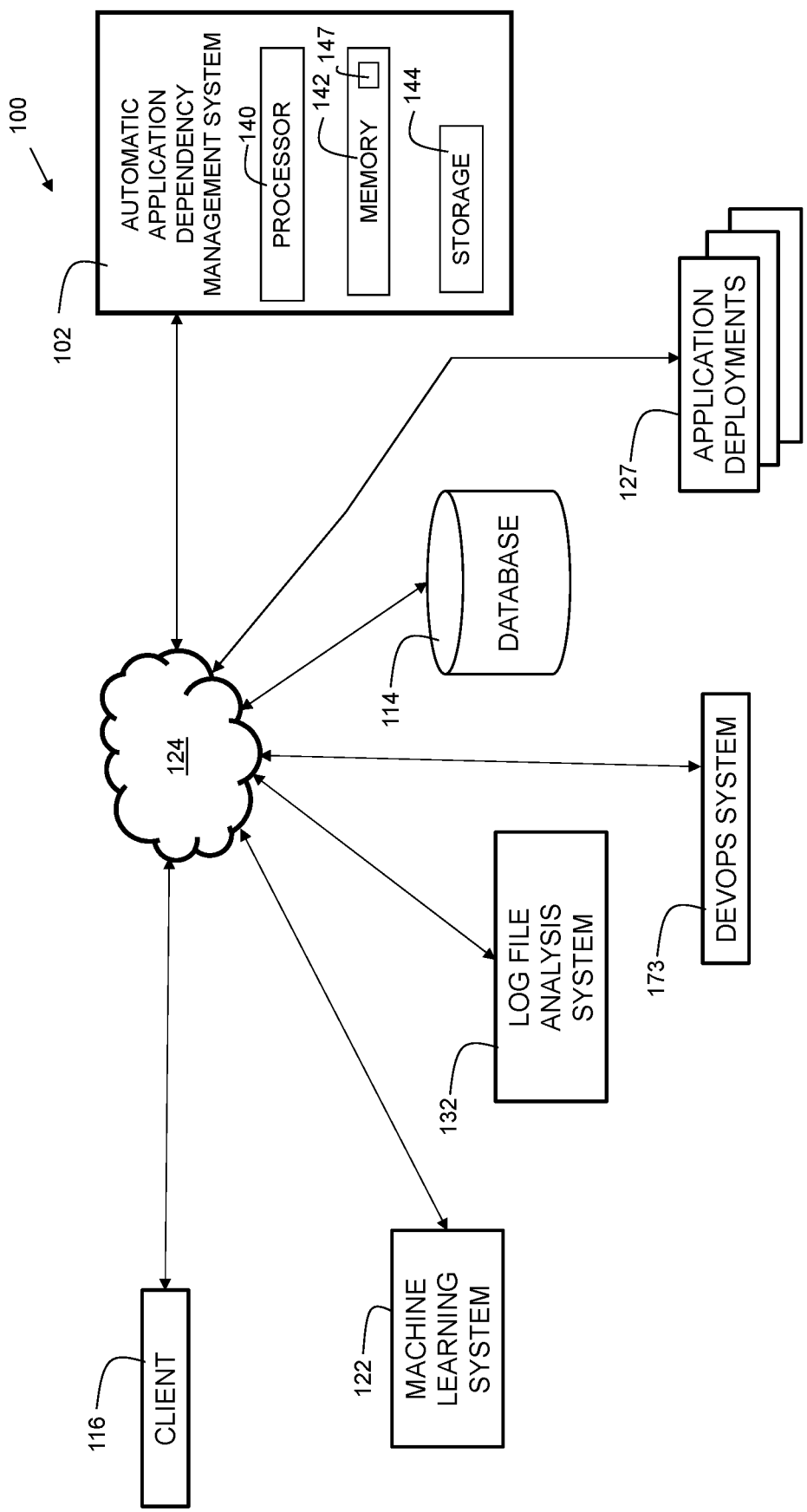
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide automatic application dependency management. Modern software, ranging from enterprise level deployments, to embedded software applications, often rely on many different components. These components can include combinations of many off-the-shelf software packages and/or open-source software packages that interact with each other. Due to the large number of components in these systems, and the various versions of each of these components, it is mathematically impractical to test every possible combination of components (software packages) to implement a complex software system.

Disclosed embodiments maintain a database of deployed configurations, as well as attempted configurations that failed. Upon detecting a failed deployment, disclosed embodiments search the database for working configurations that most closely resemble the failed configuration, and rank the configurations based on various criteria. Disclosed embodiments may then automatically select a highest ranked working configuration, and perform an automatic upgrade of the necessary components to create a working configuration.

Additionally, in some embodiments, a system administrator, engineer, or other stakeholder may submit a proposed configuration change, and disclosed embodiments can pre-emptively review the proposed configuration change and determine if it has been known to be a successful configuration, or alternatively, known to be an unsuccessful configuration. In this way, disclosed embodiments serve to improve the technical field of operating multiple-component computer applications, by reducing downtime due to invalid and/or underperforming configurations.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is an environment 100 for embodiments of the present invention. An automatic application dependency management system (AADMS) 102 may include a processor 140, memory 142, and storage 144. The processor 140 is coupled to the memory 142 such that it can access instructions 147 stored in memory 142. The processor 140 executes the instructions 147, stored in memory 142, in implementation of embodiments of the present invention. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. The storage 144 may include one or more hard disks, or other suitable storage technology. The AADMS 102 is connected to network 124. Network 124 is the Internet, a wide area network, a local area network, or any other suitable network. System 102 is an electronic computation device. Note that while one such device is shown in environment 100, in practice, there may be multiple electronic computing devices operating in a distributed manner for load balancing and data redundancy.

The environment 100 may further include a database 114. The database 114 may be used for storing configurations for applications. The configurations can include a list of components, and corresponding versions for each component in the list. The database 114 may be a relational database, such as a SQL database. In embodiments, the database 114 may be a No-SQL database, or other suitable database type with the schema for storing and retrieving configuration data. Additional metadata may also be stored, such as average downtime when upgrading to a given version of an application, cost, and/or upgrade path for upgrading a component to a given version. Some of this information may be crowdsourced from other users who opt in for data collection regarding their application configurations. The database 114 may further contain lists of working and non-working configurations that have been used or attempted by users. In embodiments, the database 114 is searched for working configurations that are similar to a given non-working configuration, and a configuration distance is computed between the given non-working configuration and the working configurations. The distance may be used as a ranking criterion to determine the appropriate working configuration to use.

Administration client 116 is also connected to network 124. Administration client 116 is a computing device operated by a person (e.g., software developer, administrator, or other stakeholder). The administration client 116 may include a desktop computer, tablet computer, laptop computer, or any other suitable computation device now known or hereafter developed. The administration client may have Ethernet, Bluetooth®, Wi-Fi, or other suitable communication interface to communicate over network 124.

One or more application deployments 127 are also part of the environment 100. An application deployment is a collection of one or more applications running on one or more computing devices. Examples of such devices can include, but are not limited to, cloud-hosted computing devices, containerized application, virtual machines, smartphones, tablet computers, laptop computers, consumer electronics devices, automobiles, wearable computing devices, datacenter devices, gaming consoles, telecommunications equipment, avionics equipment, and/or networking devices. Deployments can be categorized by operating environment, geographic regions, and/or other conditions. Application deployments 127 may include multi-component applications that have multiple components that need to interact with each other to perform a task. An example of such components can include databases, file servers, web servers, and/or other application servers. The versions of all these components should be compatible with each other in order to ensure proper functionality.

Environment 100 further includes a DevOps system 173. The DevOps system 173 can include a continuous integration system such as Jenkins, a code collaboration tool such as Gerrit, and/or a code distribution tool to push upgrades to the deployments. In embodiments, when a working configuration is identified in the database 114, it is automatically deployed via the DevOps system 173.

Environment 100 further includes log analysis system 132. The computing devices within each deployment generate log files. Log files are typically text-based files that contain information about the operation of the device. Warnings, errors, and other unexpected conditions are typically written to one or more log files. The computing devices within the deployments then typically upload the log files to the log analysis system 132 on a regular basis. On the log analysis system 132, certain text strings and/or patterns, referred to as "markers", are identified as indicative of an error or other problem warranting investigation. The information in the log files can be used to determine an interaction between components of a multi-component system. The information in the log files can be used to identify transactions between components of a multi-component system. Transactions can include exchange of information based on events, interrupts, and/or other conditions. The log analysis system 132 may include log analysis tools such as Splunk, Loggly, or other suitable log analysis system.

Optionally, machine learning system 122 may be used to further categorize and classify input data including log files, deployment configurations, and/or other metadata pertaining to deployments and/or individual components of a multi-component application. Machine learning system 122 may include one or more neural networks, convolutional neural networks (CNNs), and/or other deep learning techniques. The machine learning system 122 may include regression algorithms, classification algorithms, clustering techniques, anomaly detection techniques, Bayesian filtering, and/or other suitable techniques to analyze the information.

The machine learning system 122 may perform adaptive component compatibility analysis. In this way, configurations that may be suboptimal in terms of throughput, downtime, or other metric, may be identified in an automated way by machine learning system 122.

Figure 2:
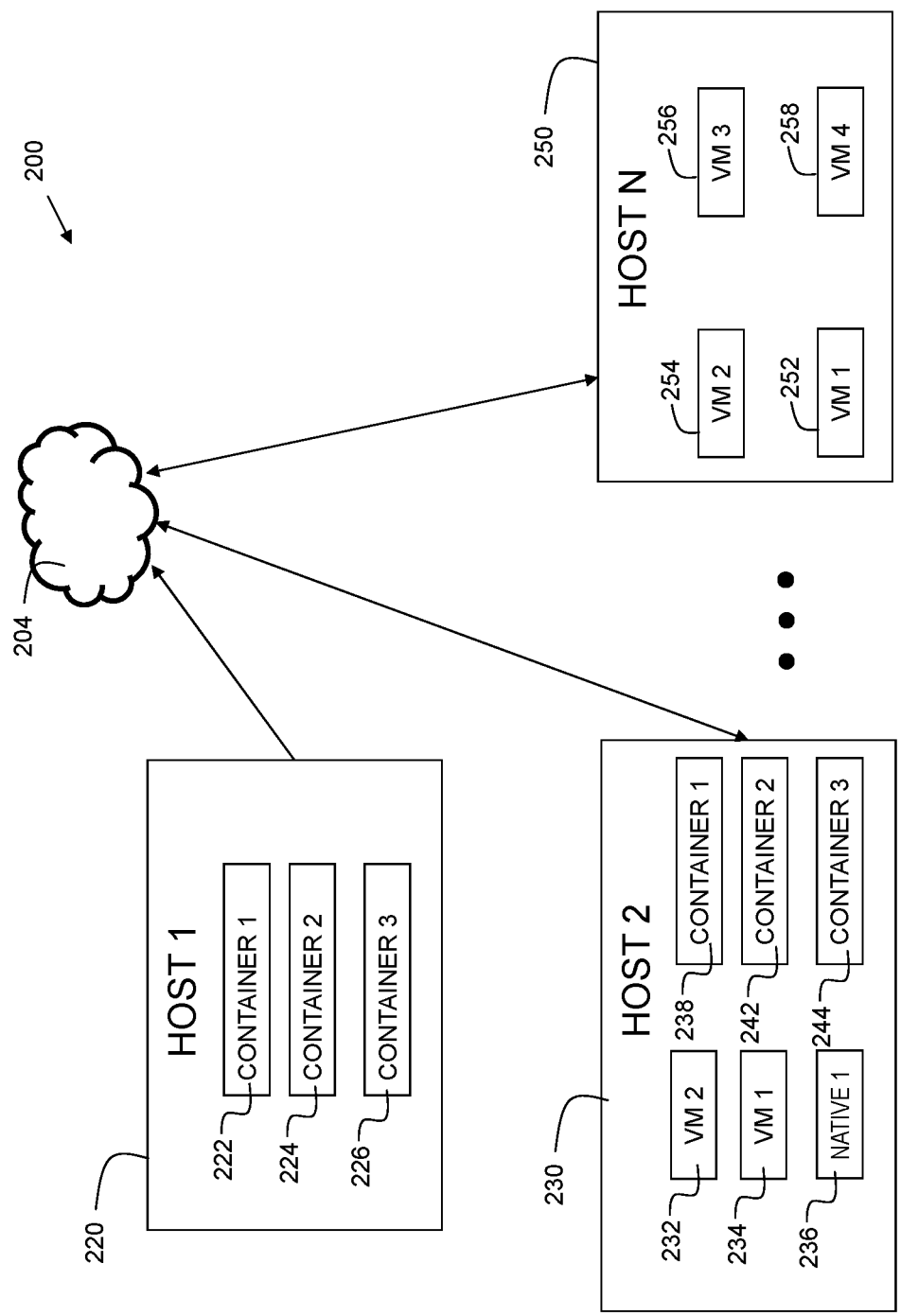
FIG. 2 shows an example of an architecture for execution of multiple-component applications.

FIG. 2 shows an environment 200 for deployment of multi-component applications used in embodiments of the present invention. As shown in FIG. 2, multiple hosts are connected to network 204. Network 204 may be the Internet, a wide area network, local area network, or other suitable network.

Three computers that implement a cluster of nodes are shown also connected to the network. These computers are Host 1 220, Host 2 230, and Host N 250. Host 1 220, Host 2 230, and Host N 250 are computer systems (host machines) which may include thereon one or more containers, one or more virtual machines (VMs), or one or more native applications. These host machines are typically self-sufficient, including a processor (or multiple processors), memory, and instructions thereon. Host 1 220, Host 2 230, and Host N 250 are each computers that together implement a cluster.

Host 1 includes instances of three containers: Container 1 222, Container 2 224, and Container 3 226. A container image is a lightweight, stand-alone, executable package of software that includes everything needed to perform a role that includes one or more tasks. The container can include code, runtime libraries, system tools, system libraries, and/or configuration settings. Containerized software operates with some independence regarding the host machine/environment. Thus, containers serve to isolate software from their surroundings.

Host 2 230 includes instances of virtual machines, containers, and a native application. The containers are Container 1 238, Container 2 242, and Container 3 244. The Native 1 236 is a native application, operating system, native instruction set, or other native program that is implemented specially for the particular model of the computer or microprocessor, rather than in an emulation or compatibility mode. The virtual machines are VM 2 232 and VM 1 234.

Host N includes instances of four virtual machines: VM 2 254, VM 1 252, VM 3 256, and VM 4 258. A virtual machine (VM) is an operating system or application environment that is installed as software, which imitates dedicated hardware. The virtual machine imitates the dedicated hardware, providing the end user with the same experience on the virtual machine as they would have on dedicated hardware.

These hosts may execute one or more components that interact with each other as part of a multi-component application. Such multi-component applications have a wide range of uses in areas such as e-commerce, education, finance, sales, business administration, and others with important functions. It is therefore important to keep these multi-component applications running as efficiently as possible and minimize downtime.

FIG. 3 shows an example log file excerpt 300. The example of excerpt 300 is for a Java component of an application. However, similar logging may be present for other components of a multi-component application. Log file excerpt 300 includes various levels of logging, such as INFO, WARNING, and ERROR. Log file excerpt 300 shows an example of an INFO entry 302, a WARNING entry 304, and an ERROR entry 306. Log files may contain other levels such as DEBUG and TRACE, for example. ERROR statements can include further categorization of the error such as MINOR, MAJOR, CRITICAL, FATAL, and/or other designators.

Referring now to the ERROR entry 306, there is an error category 308 that may optionally be used to further categorize the error. In some cases, this may be used for statistical purposes and/or other Big Data applications. The error type 310 describes the specific type of error. As shown, the example in ERROR entry 306 is an Array Index Out Of Bounds exception. The file name (ParseClassify.java) is shown at 312, and the line number within that file (line 22) is shown at 314. The error type 310, file name 312, and line number 314 are parsed from the log file and used by the AADMS 102 to check for errors and/or determine interaction between two components.

Interactions can include read transactions, write transactions, modify transactions, and so on. The types of interactions can be used in comparing configurations. As an example, one configuration may include interactions of component A reading from component B. Whereas another configuration may include interactions of component A reading and writing data in component B. In embodiments, the types of interactions between components are evaluated as a criterion in comparing configurations to identify the best working configuration to transition to.

Figure 4:
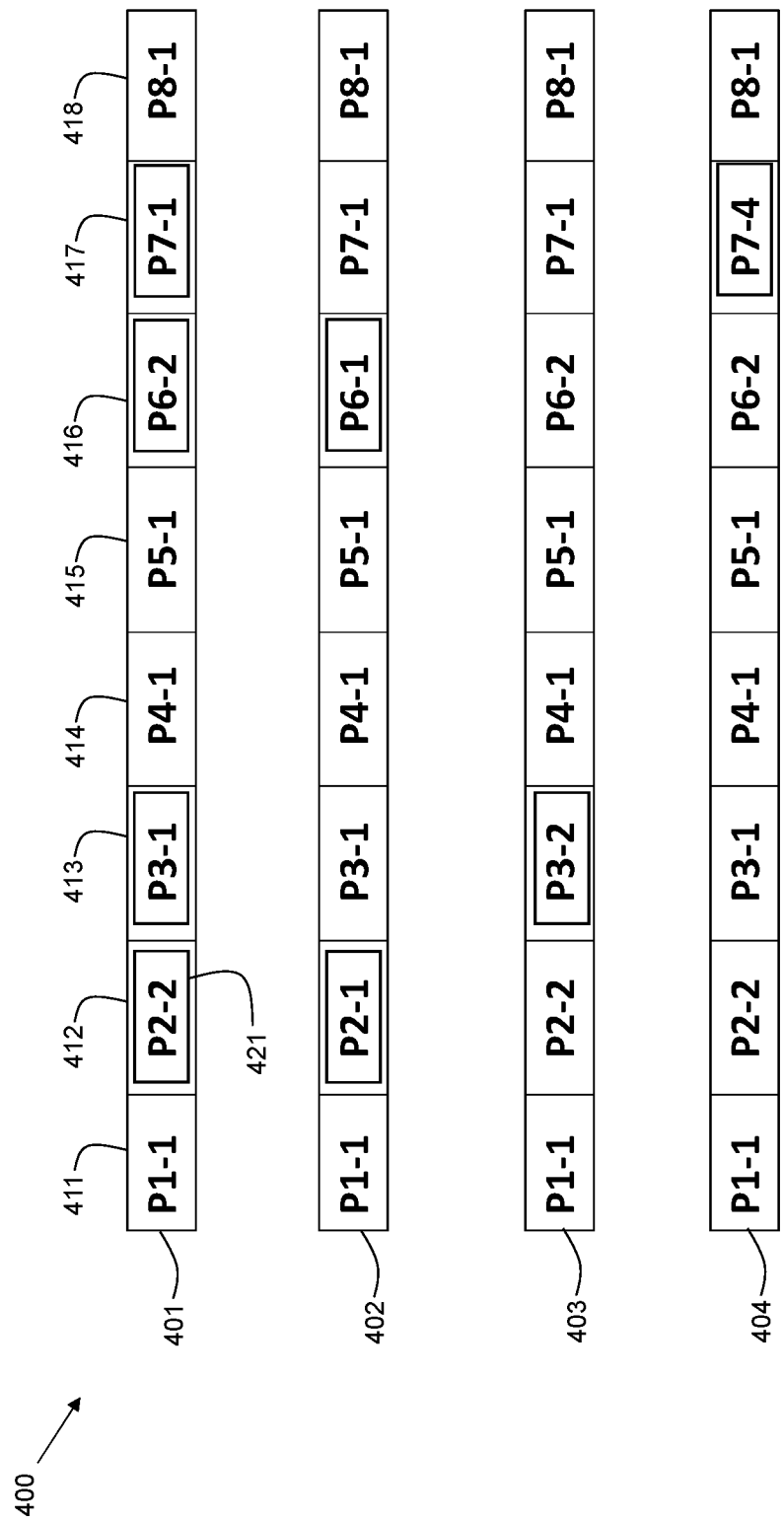
FIG. 4 shows exemplary multiple-component application information in accordance with embodiments of the present invention.

FIG. 4 shows exemplary multiple-component application information 400 in accordance with embodiments of the present invention. Information 400 includes four configurations. Each configuration is indicated by a row (401-404). Each configuration is comprised of multiple components, and each component is indicated in a column (411-418). Each component is in the form Px-y, where Px represents component (program) x, and the -y represents the version. As an example, at row 402 column 413 is component P3-1, meaning component 3, version 1. Similarly, at row 403 column 413 is component P3-2, indicating component 3, version 2. Within this example, the components that may change are indicated with an additional rectangle within the cell, such as generally indicated as 421.

Rows 401-404 represent configurations for the same multi-component application. As can be seen in each of the rows, the example multi-component application is comprised of eight components, P1-P8. Each component can have multiple versions. Some versions of a given component may be incompatible with other components of a particular version. Row 401 represents a non-working combination of components. In practice, an administrator may upgrade a version of a component, and then find out that the multi-component application no longer functions. In embodiments, the determination that the program is not functioning properly may be automatically detected from examining logs, such as shown in FIG. 3.

Upon detecting a non-working configuration, the AADMS 102 may search the database 114 to identify additional configurations for that application that are known to be working. Rows 402-404 represent examples of working configurations for the same multi-component application represented by the configuration indicated in row 401.

Referring now to row 402, there are two components that differ in version between row 402 and row 401. These differences are in column 412 and column 416. In this case, an administrator could repair the configuration of 401 by downgrading component P2 from version 2 to version 1, and also downgrading component P6 from version 2 to version 1. Thus, two changes, both downgrades of components, can convert the non-working configuration of row 401 to the working configuration of row 402.

Referring now to row 403, there is one component that differs in version between row 403 and 401. This difference is shown in column 413. In this case, an administrator could repair the configuration of row 401 by upgrading component P3 from version 1 to version 2.

Referring now to row 404, there is one component that differs in version between row 403 and 401. This difference is shown in column 417. In this case, an administrator could repair the configuration of row 401 by upgrading component P7 from version 1 to version 4.

Thus, a transition from the configuration of row 401 to the configuration of row 402 requires downgrade of two components. A transition from the configuration of row 401 to the configuration of row 403 requires upgrade of one component by one version. A transition from the configuration of row 401 to the configuration of row 404 requires upgrade of one component by three versions. Each of the changes can be weighted, and the weights combined to derive a configuration distance. In embodiments, a distance may be computed. As an example, each component that requires a change adds a value of one to a distance if it is an upgrade, or a value of two to a distance if it is a downgrade. The number of versions required to upgrade may be factored in as a multiplier. As an example, if upgrading from version 1 to version 2 of a component as in the case of the configuration of row 403, the multiplier can be (2−1)=1. Similarly, if upgrading from version 1 to version 4 of a component as in the case of the configuration of row 404, the multiplier can be (4−1)=3.

Using the above rules, the configuration distance between the configuration of row 401 and the working configurations of rows 402-404 can be computed as follows.

For row 402, there are two downgrades, indicated at column 412 and 416. Each downgrade is by one version. Component P2 is downgraded from version 2 to version 1. Component P6 is also downgraded from version 2 to version 1. Thus, each component has a multiplier of 1. Downgrades have a value of 2. Therefore, with two downgrades, each having a multiplier of 1, the configuration distance is 2+2=4.

For row 403, there is one upgrade, indicated at column 413. The upgrade is by one version. Component P2 is downgraded from version 2 to version 1. Component P6 is also downgraded from version 2 to version 1. Thus, each component has a multiplier of 1. Downgrades have a value of 2. Therefore, with two downgrades, each having a multiplier of 1, the configuration distance is 2+2=4.

For row 404, there is one upgrade, indicated at column 417. The upgrade is by three versions. Component P7 is upgraded from version 1 to version 4. The upgrading through multiple versions can add a complexity that can be accounted for in disclosed embodiments utilizing a version change friction factor. The version change friction factor can be stored in the database as metadata for a given component and/or configuration. As an example, in some cases, a component can be upgraded directly from version 1 to version 4. In other cases, a component must be upgraded sequentially from version 1 to version 2, then to version 3, and then to version 4. In a case where sequential upgrade is required to upgrade to multiple versions in order to obtain a working configuration, the version change friction factor can be set to account for this, as compared with a component that is capable of direct upgrading. In embodiments, the metadata can include an upgrade path field which provides an indication of how many intermediate versions must be upgraded in order to achieve the working configuration. Thus, in the example of FIG. 4, the configuration indicated by row 403 may be ranked higher than (and selected over) the configuration indicated by row 404. Even though the configurations of both rows 403 and 404 require only one component to be changed, the configuration of row 403 requires component P3 be upgraded to the next version number (from version 1 to version 2, as shown in column 413). In contrast, the configuration of row 404 requires component P7 to be upgraded multiple versions (from version 1 to version 4), in order to achieve the working configuration. Thus, given the non-working configuration of row 401 as a starting point, transitioning to the configuration of row 403 is likely the easiest and safest course of action to obtain a working configuration. Embodiments include ranking the one or more configurations based on the configuration distance.

Figure 5:
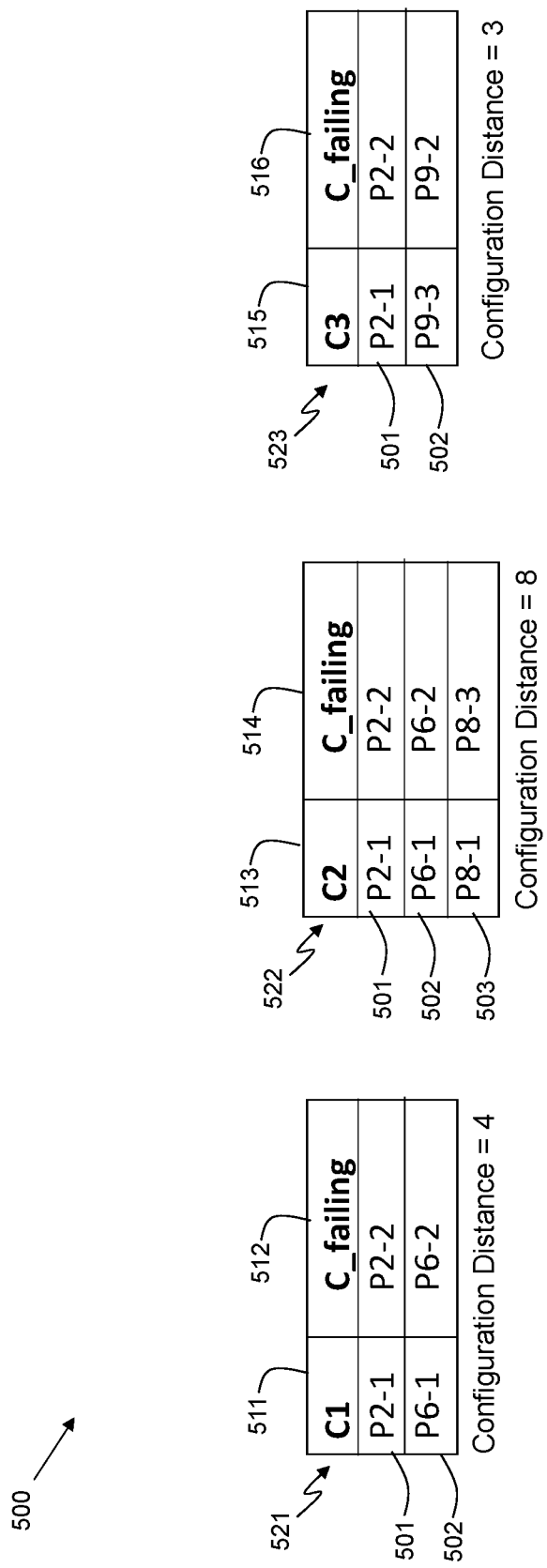
FIG. 5 shows additional exemplary multiple-component application information in accordance with embodiments of the present invention.

FIG. 5 shows additional exemplary multiple-component application information 500 in accordance with embodiments of the present invention. Row and column numbers are used to refer to a particular piece of information. There are six columns (511-516), and 3 rows (501-503). Table 521 shows a comparison of components that require changes between the current configuration which is denoted by C_failing in column 512, and a working configuration which is denoted by C1 in column 511. As can be seen in table 521, two components are required to change, and both components require downgrading to the previous version. Component P2 (indicated at row 501 column 511) requires a downgrade from version 2 (indicated at row 501 column 512) to version 1. Component P6 (indicated at row 502 column 511) requires a downgrade from version 2 (indicated at row 502 column 512) to version 1.

Table 522 shows a comparison of components that require changes between the current configuration which is denoted by C_failing in column 514, and a working configuration which is denoted by C2 in column 513. As can be seen in table 522, three components are required to change. The components P2 (row 501, column 513) and P6 (row 502, column 513) both require a downgrade to the previous version. Component P8 (row 503, column 513) requires a downgrade of two versions from version 3 (indicated in row 503 column 514) to version 1 (indicated in row 503, column 513).

Table 523 shows a comparison of components that require changes between the current configuration which is denoted by C_failing in column 516, and a working configuration which is denoted by C3 in column 515. As can be seen in table 523, two components are required to change. The component P2 (row 501, column 515) requires a downgrade to the previous version. Component P9 (row 502, column 515) requires an upgrade from version 2 (indicated in row 502 column 516) to version 3 (indicated in row 502, column 515).

A configuration distance can be computed for each possible configuration. Using the same rules and values as described in FIG. 4, the following configuration distances can be computed. These distances may be computed by the AADMS 102 based on information retrieved from the database 114.

Referring again to table 521, the configuration distance between C_failing in column 512 and C1 in column 511 is:

2×2=4 since each downgrade has a count of two.

Referring again to table 522, the configuration distance between C_failing in column 514 and C2 in column 513 is:

2×2+2 (3−1)=2×2+4=8 since there are three downgrades, and each downgrade has a count of two, and the downgrade in row 503 is a downgrade of two versions, hence the multiplier of (3−1).

Referring again to table 523, the configuration distance between C_failing in column 516 and C3 in column 515 is:

2+1=3 since there is one downgrade to an adjacent version (from version 2 in row 501 column 516 to version 1 in row 501 column 515), and one upgrade to an adjacent version (from version 2 in row 502 column 516 to version 3 in row 502 column 515).

Thus, the configuration C3 has the lowest configuration distance of the three working configurations, and therefore, is selected by the AADMS 102. In embodiments, the AADMS 102 may initiate an automatic configuration change via DevOps system 173. Note that the rules and mathematical coefficients described above are exemplary, and other rules and/or mathematical coefficients and/or formulas may be used in embodiments of the present invention.

Referring again to tables 521, 522, and 523, the component P2 is present in all three tables. Thus, in this example, in order to migrate the current failing (non-working) configuration to a working configuration, it is necessary to downgrade component P2 from version 2 back to version 1. Thus, component P2 is an example of a common modification component, since that component needs to be changed regardless of which working configuration is chosen.

Embodiments can include identifying one or more common modifications components. Embodiments can include performing an automatic upgrade of the common modification components to place the configuration in a prepared state. In the prepared state, the components that are required to be changed for any of the proposed configurations are upgraded. The common modification components can be upgraded prior to selecting a working configuration, thereby saving time. In some embodiments, the configuration with the shortest configuration distance is automatically deployed to create a working configuration. In other embodiments, the working configurations are presented in a report to the administrator. The administrator can then decide which configuration to deploy, and only the specific component changes for the selected configuration remain to be upgraded. In this way, embodiments allow the administrator to retain full control of the application configuration. In the example of FIG. 5, if there was some operational, or business reason why component P9 could not be upgraded to version 3 (row 502 column 515), then the administrator could select from one of the other working configurations to deploy.

Figure 6:
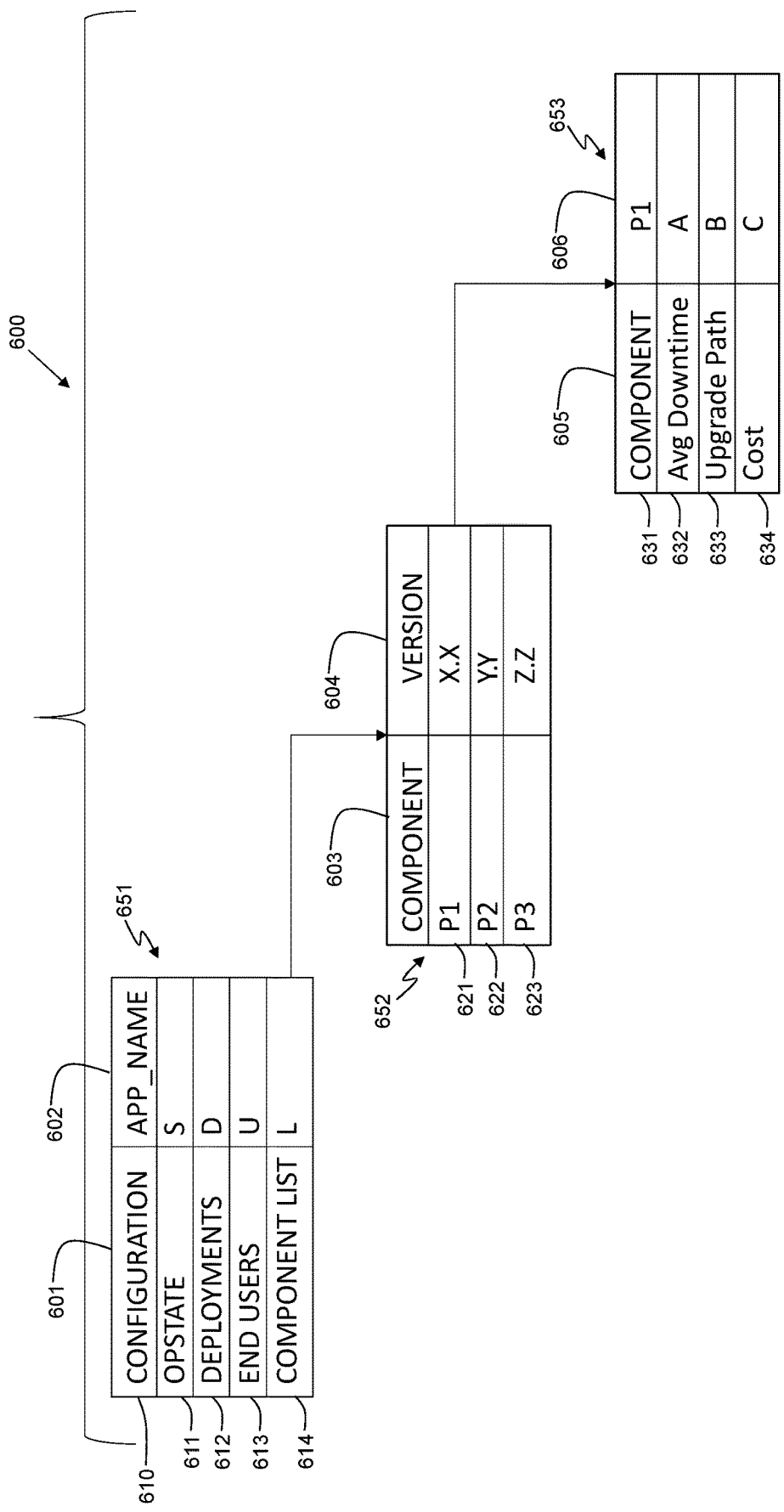
FIG. 6 shows data structures for multiple-component application configuration information in accordance with embodiments of the present invention.

FIG. 6 shows data structures 600 for multiple-component application configuration information in accordance with embodiments of the present invention. These data structures may be stored in the database 114. The data structures 600 include three related tables, indicated as 651, 652, and 653. Each table has information denoted by rows and columns. Table 651 has rows 610-614 and columns 601-602. Table 652 has rows 621-623 and columns 603-604. Table 653 has rows 631-633 and columns 605-606. Table 651 includes a configuration (CONFIGURATION) field at row 610. At row 610, column 602, is a value APP_NAME, which may reflect the name of the multi-component application. Table 651 includes an operational state (OPSTATE) at row 611. The OPSTATE has a value S stored at row 611 column 602. In embodiments, the value S can be a Boolean indicating working or non-working. In other embodiments, the value S can be an enumeration indicating various states such as fully operational, degraded, non-working, and/or other states. Table 651 includes a number of deployments (DEPLOYMENTS) at row 612. The DEPLOYMENTS has a value D stored at row 612 column 602. In embodiments, the value D can be an integer indicating the number of deployments of this configuration. In embodiments, this information may be crowdsourced from users/administrators that opt in to a system to participate in sharing of configurations attempted and/or used, in exchange for having access to the database of working and non-working configurations. In embodiments, a working configuration with a higher number of deployments may be ranked higher than a working configuration with fewer deployments. Table 651 includes a number of end users (END USERS) at row 613. The END USERS has a value U stored at row 613 column 602. In embodiments, the value U can be an integer indicating the number of end users of this configuration among all deployments. In embodiments, this information may be crowdsourced from users/administrators that opt in to a system to participate in sharing of configurations attempted and/or used, in exchange for having access to the database of working and non-working configurations. In embodiments, a working configuration with a higher number of end users may be ranked higher than a working configuration with fewer end users. In embodiments, the value U may be used instead of, or in conjunction with, the value D. These values provide a metric of how widely deployed a configuration is. In general, a working configuration that is more widely deployed may be more stable than a working configuration that is not as widely deployed. Furthermore, known issues with a working configuration may be better documented when a working configuration is widely deployed. Thus, considering the number of deployments and/or end users enables disclosed embodiments to consider those factors in the ranking of working configurations. The ranking may be adjusted by a factor based on the values of D and/or U.

Table 651 further includes a component list at row 614. The list L is shown at row 614, column 602, and is represented by related table 652. Table 652 shows a list of each component in the configuration in column 603, with its corresponding version in column 604. Each row refers to a different component of the configuration. The number of rows in table 652 is thus dependent on the number of components in the configuration. While three rows are shown for table 652, in practice, there can be more or fewer rows for table 652, depending on the number of components in the configuration. Column 603 of table 652 contains a component name. Column 604 of table 652 contains a program version. As an example, at row 621 column 603, contains the component name P1, and at row 621, column 604, contains the component version X.X corresponding to component P1. The other rows 622 and 623 contain version information for components P2 and P3 respectively. In practice, there can be more or fewer rows in table 652. For each row in table 652, there is a reference to a corresponding table 653 containing component metadata. Column 605 contains a field name, and column 606 contains a corresponding value. At row 631 column 605 is the component field. At row 631 column 606 is an exemplary value "P1" for the component field. At row 632 column 605 is the average downtime field. At row 632 column 606 is an exemplary value "A" for the average downtime field. In embodiments, the value A can be a duration in minutes, hours, or other suitable time units. The duration can represent an average time required to upgrade to a particular version. In some embodiments, the value A may be an array, indicating average time to upgrade between various versions. In embodiments, the average time may be obtained by using crowdsourced information from participants that opt in to share such information.

At row 633 column 605 is the upgrade path field. At row 633 column 606 is an exemplary value "B" for the upgrade path. In embodiments, B can be an array, or other suitable data structure containing multiple values. The data structure can include an ordered list of versions of the component, indicating intermediate versions that may be necessary to upgrade to a given version. As an example, to upgrade from version 1.2 of component P1 to version 4.3 of component P1, it may be first necessary to upgrade from version 1.2 to version 3.0, and then upgrade from version 3.0 to version 4.3. Thus, the upgrade path in that example is 1.2→3.0→4.3. In another example, it may further be necessary to upgrade from version 3.0 to 4.0, and then upgrade from 4.0 to 4.3. In that example, the upgrade path is 1.2→3.0→4.0→4.3. As can be seen, the second upgrade path is longer than the first upgrade path. In embodiments, the upgrade path may be used as a criterion for selecting the best configuration to upgrade to. In embodiments, a longer upgrade path lowers the rank of a candidate configuration, since it requires more time to perform the upgrades.

At row 634 column 605 is the cost field. At row 634 column 633 is a cost C for the version. In embodiments, the cost C can be an array indicating costs of various versions, and in various currencies. In embodiments, the cost to acquire a given version of a component may be used as a criterion for selecting the best configuration to upgrade to. As an example, there can be a situation where there are two candidate working configurations, and each requires an upgrade of one component. A first configuration requires an upgrade of component P1, and a second configuration requires an upgrade of component P2. If obtaining the required version of component P1 has a lower financial cost to obtain than the required version of component P2, then the first configuration may be ranked higher than the second configuration, based on the cost.

The data structures 600 are exemplary, and other embodiments may have more, fewer, and/or different data structures. Embodiments include ranking the one or more configurations based on the configuration distance. In some embodiments, the rank is further based on a deployment size. In some embodiments, the rank is further based on upgrade path. In some embodiments, the rank is further based on cost. In some embodiments, the rank is further based on average downtime.

Figure 7:
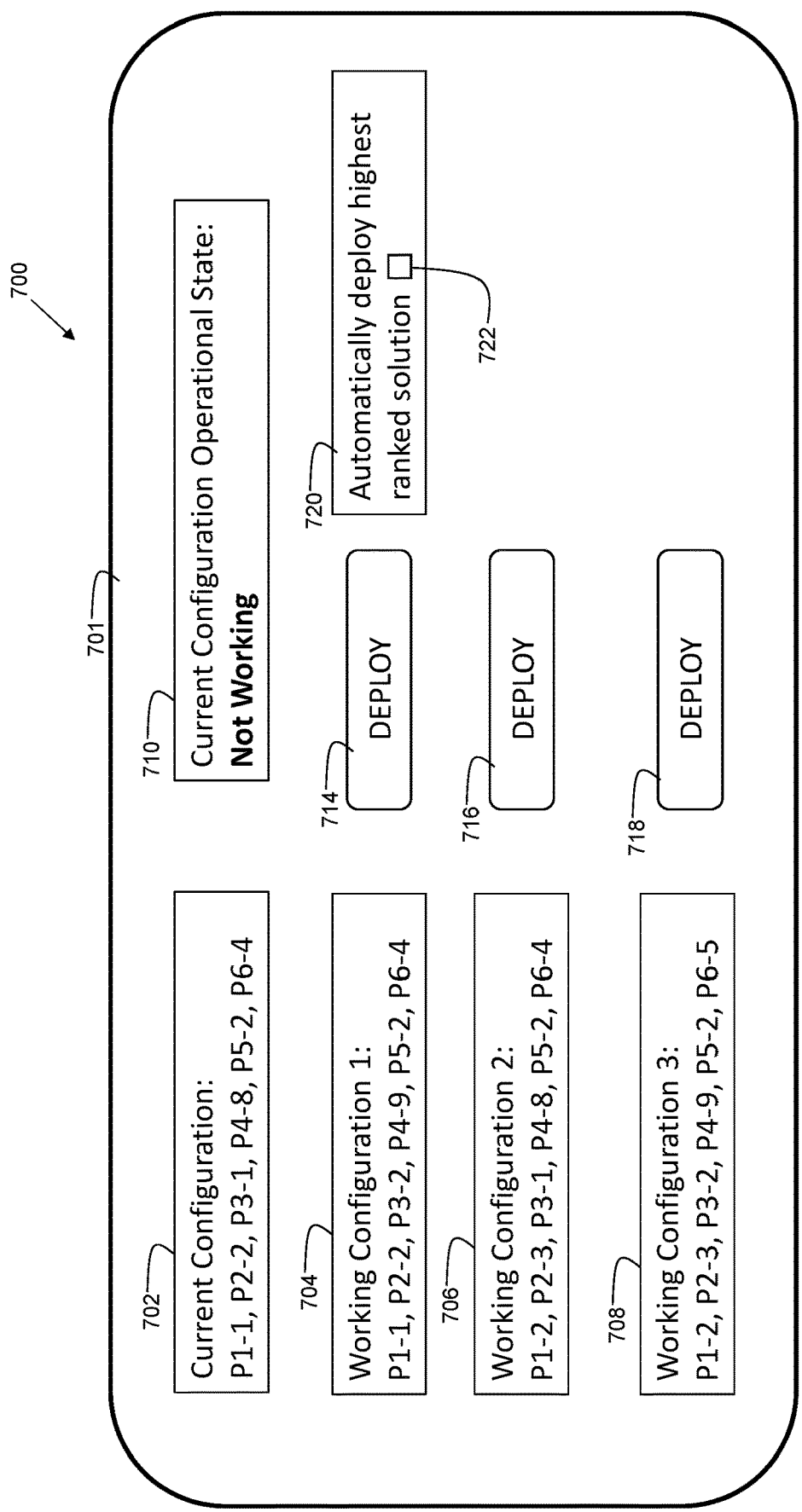
FIG. 7 shows an exemplary application report in accordance with embodiments of the present invention.

FIG. 7 shows an exemplary application report 700 rendered on an electronic display device 701 in accordance with embodiments of the present invention. Report 700 includes a current configuration field 702. The current configuration field lists the components and corresponding versions of the current configuration for a multi-component application. Field 710 shows a current operational state. In embodiments, the operational state may be detected from log files for the application, such as shown in FIG. 3. In the example of FIG. 7, the current state is "Not Working." Embodiments may have states including, but not limited to, Working, Not Working (non-working), and Degraded. In some embodiments, multiple levels of functioning may be expressed through alphanumeric codes, or other suitable techniques.

Fields 704, 706, and 708 show candidate working configurations. Candidate working configurations are configurations that may be transitioned to from the current configuration. These working configurations may have been identified by AADMS 102 by searching through database 114, and computing a configuration distance for working configurations that are found. The working configurations can then be ranked based on configuration distance and/or other factors. A deploy button 714 corresponds to the working configuration indicated at 704. If the deploy button 714 is invoked, the configuration shown in field 704 is deployed. A deploy button 716 corresponds to the working configuration indicated at 706. If the deploy button 716 is invoked, the configuration shown in field 706 is deployed. A deploy button 718 corresponds to the working configuration indicated at 708. If the deploy button 718 is invoked, the configuration shown in field 708 is deployed. In embodiments, the deployment occurs via the DevOps system 173, SNMP, or other suitable mechanisms.

Field 720 contains an automatic deployment option. A checkbox 722, if selected, causes the AADMS 102 to automatically deploy the highest ranked configuration upon detecting a current configuration operational state of "Not Working" as indicated at field 710. In this way, downtime due to invalid configurations is minimized.

Figure 8:
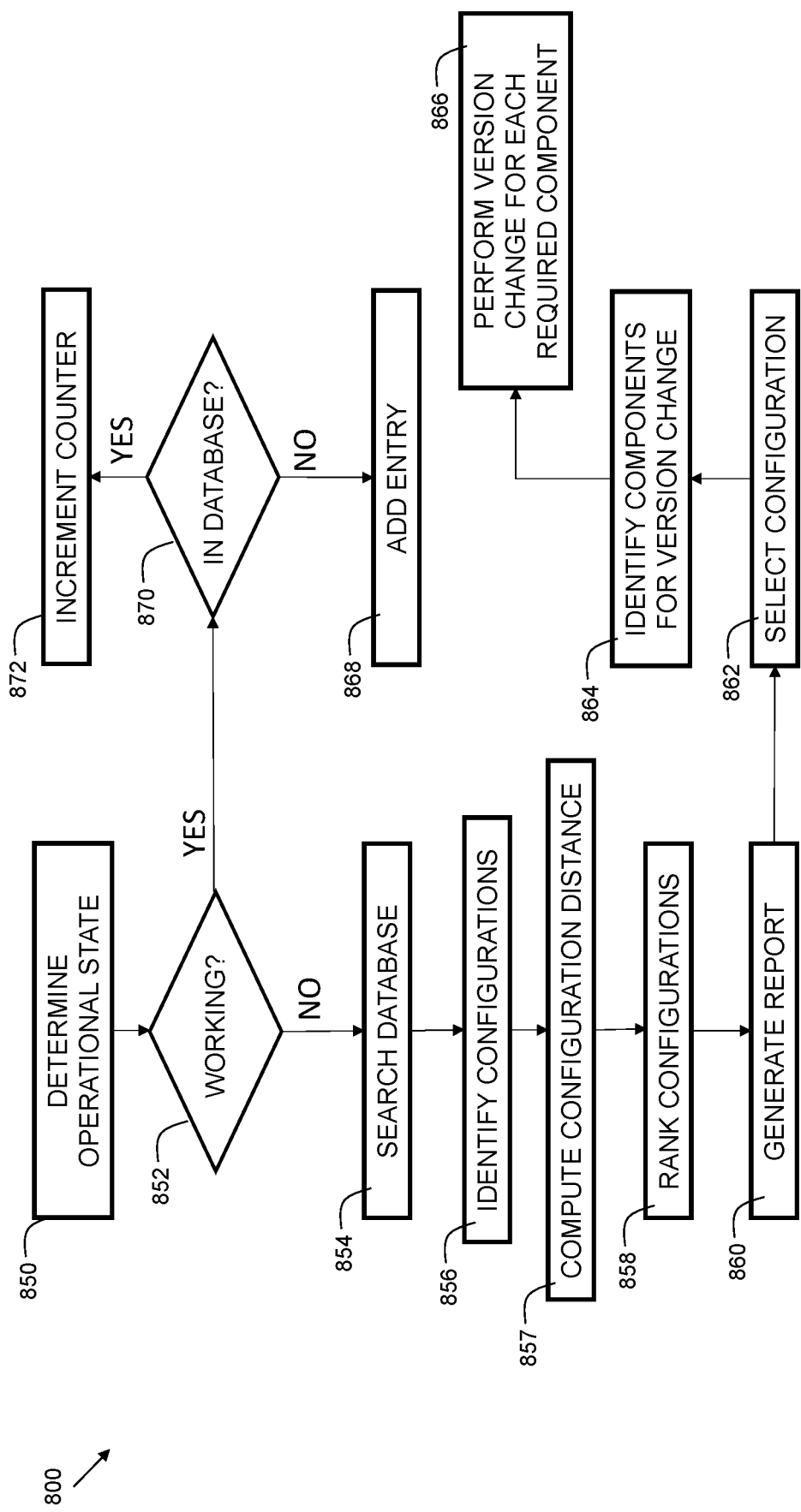
FIG. 8 is a flowchart indicating process steps in accordance with embodiments of the present invention.

FIG. 8 is a flowchart 800 indicating process steps in accordance with embodiments of the present invention. At 850, an operational state is determined. This may be accomplished through API calls, SNMP, exchange of information through XML, JSON, or other suitable mechanisms. In some embodiments, log files, such as from a syslog utility or other logging mechanism, may be monitored and parsed to identify markers. Markers are string patterns that identify an operational state. The markers may be used to identify the operational state in some embodiments. At 852, a check is made to determine if the current operational state is "working." If yes at 852, then the process continues to 870 where a check is made to determine if the current configuration is in the database (114 of FIG. 1). If yes at 870, then a counter is incremented at 872 to keep track of the number of instances of this configuration that are deployed. If no at 870, then a new entry is added in the database at 868 for this working configuration. If, at 852, the operational state is "Not Working," then the process continues to 854 where the database is searched for working configurations for the application. At 856, working configurations are identified. At 857, the configuration distance between the current configuration and each candidate working configuration is computed.

In embodiments, the configuration distance X may be computed as:

$$X = J + \sum_{i=1}^{J}(F(i))$$

Where:
J is the number of components that need to be changed between an input configuration and a candidate configuration; and
F(i) is a version change friction factor for component i.

At 858, the configurations are ranked. A ranking score Y may be used to rank the configurations based on the distance. In embodiments, a lower score Y represents a better configuration than a higher score. In embodiments, the ranking score Y is computed as:

$$Y = X - M(D, U)$$

Where: X is the configuration, and M is a function of the number of deployments D and the number of end users U of a working configuration. The value of M increases as D and U increase. This has the effect of increasing the rank of a widely deployed configuration over a configuration with a similar configuration distance, but is not widely deployed. This provides the added benefit of favoring configurations that have more hours of usage than lesser used (and hence, potentially containing more defects) configurations.

At 860, a report is generated, such as shown in FIG. 7. At 862, a configuration is selected. In embodiments, the configuration selection 862 may be selected and deployed automatically (e.g., when checkbox 722 of FIG. 7 is checked). At 864, components that require a version change (upgrade or downgrade) are identified. In embodiments, this may be accomplished by comparing data in a manifest file or other configuration information that indicates versions of each component. Versions of components that differ between the current configuration and the selected working configuration are identified as requiring a version change in order to deploy the working configuration. At 866, the version change for each required component is performed. In embodiments, the deployment occurs via the DevOps system 173, SNMP, or other suitable mechanisms.

Embodiments can include, searching for a matching configuration, and in response to not finding a matching configuration when the operational state is working; creating a new record in the configuration database corresponding to a configuration for the multiple-component software system. Embodiments can include, determining the operational state as non-working, and in response to determining the operational state as non-working: selecting one of the one or more identified configurations; identifying one or more configuration components requiring a version change based on the selected configuration; and performing an automatic version change for each of the identified configuration components.

Figure 9:
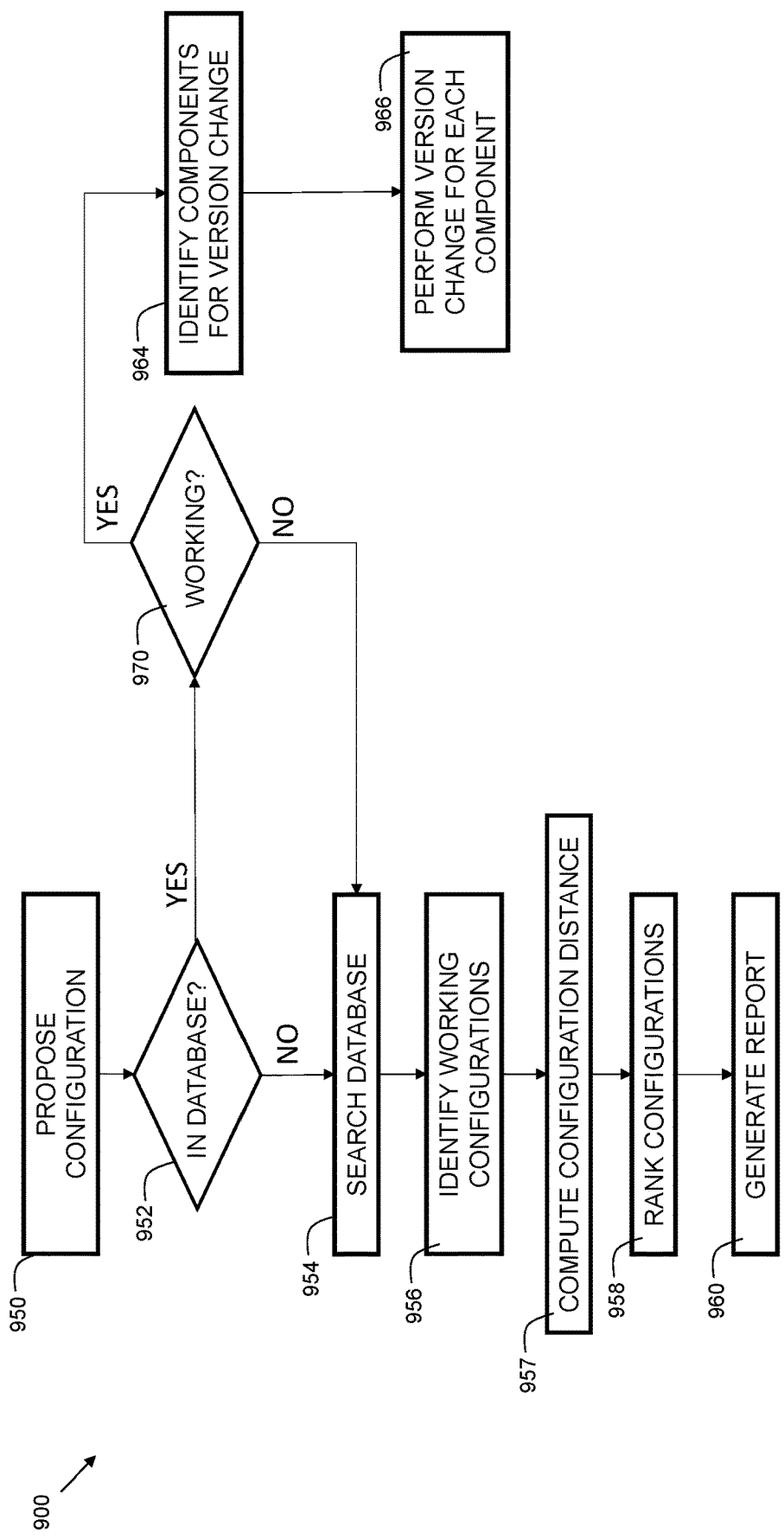
FIG. 9 is a flowchart indicating process steps in accordance with additional embodiments of the present invention.

FIG. 9 is a flowchart 900 indicating process steps in accordance with additional embodiments of the present invention. Flowchart 900 illustrates process steps for a feature of disclosed embodiments that provides a proactive verification of a configuration before it is deployed. In embodiments, both working and non-working configurations are stored in the database 114. As an example, when a user deploys a particular combination of components that results in a non-working configuration, it can be stored in database 114 as a confirmed non-working configuration. If another user considers deployment of the same configuration, the database 114 can be checked prior to deployment. If the proposed configuration is identified as non-working, then the administrator can skip the attempt to deploy that configuration and find a working configuration. This approach can save considerable time and computing resources.

At 950, a configuration is proposed. This may include submitting a configuration as a list of components and corresponding versions in the form of a manifest file, Helm chart, or other configuration file to the AADMS 102. At 952, a check is made to determine if the proposed configuration is in the database. If yes at 952, the process continues to 970, where a check is made to determine if the configuration is known to be a working configuration. If yes at 970, then the process continues to 964 where components that require a version change (upgrade or downgrade) are identified. In embodiments, this may be accomplished by comparing data in a manifest file or other configuration information that indicates versions of each component. Versions of components that differ between the current configuration and the selected working configuration are identified as requiring a version change in order to deploy the working configuration. At 966, the version change for each required component is performed. In embodiments, the deployment occurs via the DevOps system 173, SNMP, or other suitable mechanisms.

If no at 970, then the process continues to 954 where the database is searched. Similarly, if no at 952, then the process also continues to 954 where the database is searched. At 956, working configurations are identified. In embodiments, the working configurations are identified by finding configurations that contain a name for a multi-component application that matches an application name of the configuration proposed at 950. Additionally, the list of components in the configurations identified at 956 may exactly match the list of components of the proposed configuration, such that for every component in the proposed configuration at 950, a version of the same component exists in the identified working configurations, and for every component in the identified configurations at 956, a version of the same component exists in the proposed configuration at 950. This condition is illustrated in the configurations of FIG. 4.

At 957, a configuration distance is computed as described at 857 of FIG. 8. The configurations are ranked at 958, as described at 858 of FIG. 8. At 960 a report is generated, similar to as shown in FIG. 7. In this way, an administrator can get a preemptive assessment of the validity of a configuration prior to attempting a deployment.

Figure 10:
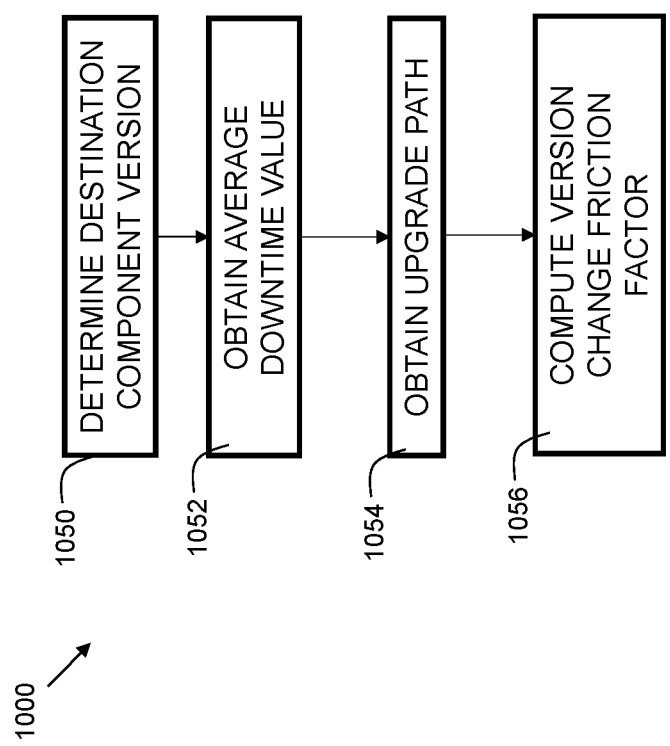
FIG. 10 is a flowchart indicating process steps for computing a version change friction factor in accordance with embodiments of the present invention.

FIG. 10 is a flowchart 1000 indicating process steps for computing a version change friction factor in accordance with embodiments of the present invention. The friction factor is a measure of how difficult, costly, and/or risky a particular version change is. In some embodiments, this information may be based in part on crowdsourced information from other users who opt in for data collection regarding their application configurations. In embodiments, the friction factor, along with the configuration distance, is used to compute the rankings of candidate working configurations and allow manual or automatic selection of the configuration that is likely to result in the easiest, fastest, and safest set of changes to achieve a working configuration.

At 1050, a destination component version is determined. In embodiments, this may be achieved by retrieving information from a manifest file or other suitable configuration data from the configuration that is to be deployed. At 1052 an average downtime value is obtained. In embodiments, this may be obtained from crowdsourced information from other users who opt in for data collection regarding their application configurations. The average downtime can include the amount of time the version change typically requires. As an example, some version changes may require length data conversion processes to convert records from an older format to a newer format, which increases the time for the version change to be performed. At 1054 an upgrade path is obtained. In some embodiments, this information may be provided by a software package vendor. The upgrade path provides an indication of how many intermediate versions must be upgraded in order to achieve the working configuration. If multiple intermediate versions need to be installed prior to the desired version of a component, it can complicate and increase the time required for a configuration change. Disclosed embodiments can account for this by incorporating it into the version change friction factor which is computed at 1056. In embodiments, a version change friction factor F(i) may be computed for component i. In embodiments, the version change friction factor is computed as follows:

$$F(i)=K_1(A)+K_2(B), \text{ where:}$$

A is an average downtime in hours, and B is an upgrade path, which is an integer representing the number of version changes needed to deploy the desired version. In the ideal case, only one upgrade is required (directly from the current version to the desired version), and the value of B is 1. In cases where intermediate versions must be installed first, the value of B reflects the number of intermediate versions in addition to the desired version, thus increasing the friction factor F(i). Thus, the friction factor F(i) increases if the downtime and/or upgrade path increases. $K_1$ and $K_2$ are constants that can be used to fine-tune the friction factor for effectiveness. The technique for computing the version change friction factor is exemplary, and other embodiments may include different factors and/or calculation techniques. In some embodiments, the version change friction factor for each component requiring a version change is added to the configuration distance. In this way, when ranking configurations by distance, a higher friction factor has the effect of pushing down configurations in the rankings, making it less likely that a complex configuration is selected over a less complex configuration, even if the number of components that need to change is the same for both configurations.

Embodiments include ranking the one or more configurations based on the configuration distance. In some embodiments, the rank is further based on a version change friction factor. In some embodiments, the friction factor is based on an average downtime value. In some embodiments, the friction factor is further based on an upgrade path.

Figure 11:
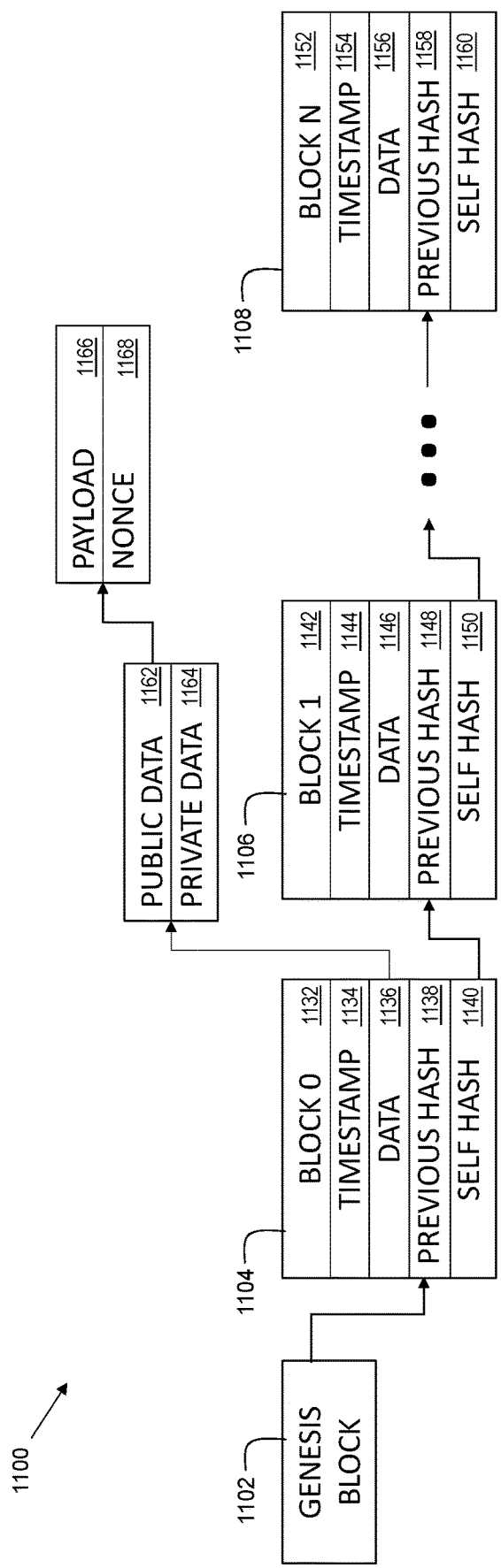
FIG. 11 shows an exemplary blockchain structure in accordance with embodiments of the present invention.

FIG. 11 shows an exemplary blockchain structure 1100 in accordance with embodiments of the present invention. In embodiments, the database 114 is implemented as a blockchain. The blockchain provides immutability, redundancy, and security that provide an effective mechanism for storing the configurations.

A blockchain is a decentralized continuously developing list of records, named blocks, which are linked and secured via cryptography. Each block usually includes a cryptographic hash of the previous block, a timestamp, and transaction data. A blockchain is inherently impervious to alteration of the data. It is an open, distributed ledger that can record transactions between multiple parties. It achieves this efficiently and in a verifiable and enduring way. As a distributed ledger, a blockchain is normally managed by a peer-to-peer network collectively following a protocol for validating new blocks. After recordation, the data in any particular block cannot be modified retroactively without the modification of all subsequent blocks, which necessitates complicity of the network majority.

At 1102, there is the genesis block (the initial block in the blockchain). The genesis block is used as the previous block for Block 0 1104. Such block includes a field for block identifier (Block 0) 1132, a field for a timestamp 1134, a data field 1136, a previous hash 1138, and a self hash 1140.

The first self hash is computed for the Block 0 utilizing the transactions inside such block. For each additional block that is generated subsequently, the previous block's hash is also used, as well as its own transactions, as input to determine its block hash. This is how a chain of blocks (the "blockchain") is created, with each block hash pointing to the block hash that originated prior to it. This system assures that no transaction in the chain can be altered later, since if any portion of the transaction is modified, the hash of the block to which it belongs is modified, as well as any following blocks' hashes. This makes it relatively likely that any tampering would be noticed since a check, via a comparison of the hashes, would reveal the discrepancy.

Accordingly, in the blocks that follow the genesis block, the "previous hash" value must match the "self hash" value of the previous block. For example, previous hash 1148 of Block 1 (1106) is supposed to match the self hash 1140 of Block 0 (1104).

Referring to block 1104, the data field 1136 contains public data 1162, and may optionally include private data 1164. The private data can be used to allow authentication of a configuration via the blockchain, without revealing the actual contents of the data. As an example, in embodiments of the present invention, details of a working configuration such as the list of components and versions can be encrypted. In some embodiments, configurations are only shared with other users after additional authentication, establishing proof of licenses, and/or other criteria. Prior to sharing the details of a configuration, using the hashes within the blockchain, it can be confirmed that the configuration is authentic. This is important to reduce the risk of malicious configurations infiltrating the database 114.

Public data field 1162 contains a field 1166 for payload (containing the configuration data such as shown in FIG. 6), and optionally a field 1168 for a nonce. Embodiments may include appending a nonce to data corresponding to the new configuration prior to creating the blockchain block. In embodiments, the nonce is selected such that a hash value for the blockchain block is below a predetermined value. This can be done to slow down an attempt to forge a blockchain copy. Finding a nonce that results in a hash that is below a maximum value requires computation cycles, which effectively governs or limits the speed at which new blocks can be added to the blockchain. This can be advantageous for security purposes in certain applications, as it limits how fast a malicious process could add blocks to the blockchain. The nonce mechanism is used to implement a Proof-of-Work (PoW) consensus protocol. However, other consensus protocols may be used in some embodiments. For example, a Proof-of-elapsed-Time (PoeT) consensus algorithm may be used to limit the rate at which blocks can be added to the blockchain. These consensus algorithms are intended to preserve blockchain integrity and prevent forking of the blockchain.

Block 1104 references block 1106 (Block 1). Previous hash 1148 is the same value as self hash 1140 of the previous block. Block 1106 includes a field for block identifier (Block 1) 1142, a field 1144 for a timestamp, a field 1146 for data, a previous hash 1148, and a field 1150 for a self hash. There can be many more blocks in the block chain. The block chain accordingly continues on to block 1108, which is indicated as Block N. Block 1108 includes a field for block identifier (Block N) 1152, a field 1154 for a timestamp, a field 1156 for data, a field 1158 for a previous hash, and a field 1160 for its self hash. To be considered valid, each value for "previous hash" must represent the value of "self hash" for the preceding block in the blockchain. In embodiments, the database includes a blockchain, and creating the new record in the configuration database includes adding a record to the blockchain.

FIG. 12 is a block diagram of a client device 1200 used in accordance with embodiments of the present invention. This represents a connected computing device such as client 116 used to configure and use embodiments of the present invention. Device 1200 includes a processor 1202, which is coupled to a memory 1204. Memory 1204 may include dynamic random-access memory (DRAM), static random-access memory (SRAM), magnetic storage, and/or a read only memory such as flash, EEPROM, optical storage, or other suitable memory. In some embodiments, the memory 1204 may not be a transitory signal per se.

In some embodiments, device 1200 further includes storage 1206. In embodiments, storage 1206 may include one or more magnetic storage devices such as hard disk drives (HDDs). Storage 1206 may additionally include one or more solid state drives (SSDs).

Device 1200, in some embodiments, includes a user interface 1208. This includes a display, keyboard, mouse, or other suitable interface. In some embodiments, the display may be touch-sensitive.

In some embodiments, the device 1200 further includes a communication interface 1210. The communication interface 1210 may be a wired communication interface that includes Ethernet, Gigabit Ethernet, or the like. In embodiments, the communication interface 1210 may include a wireless communication interface that includes modulators, demodulators, and antennas for a variety of wireless protocols including, but not limited to, Bluetooth™, Wi-Fi, and/or cellular communication protocols for communication over a computer network.

The electronic device 1200 may be used to render a report such as shown in FIG. 7, and configure the automatic deployment feature indicated at 720 by selection of checkbox 722. The electronic device 1200 may render the report utilizing HTML, or other suitable technique.

As can now be appreciated disclosed embodiments serve to improve the technical field of operating multiple-component computer applications, by reducing downtime due to invalid and/or underperforming configurations. Disclosed embodiments help simplify and manage the daunting task of determining a working configuration for multiple-component software systems. This has benefits in many types of software systems, from could-based enterprise systems to embedded systems. By tracking working and non-working configurations, and computing a configuration distance between configurations, working configurations are ranked based on distance, to provide the quickest/easiest component version change set to transform a non-working configuration into a working configuration. Thus, disclosed embodiments reduce downtime and save money for organizations, and increase the efficiency of utilization of computer resources.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining an operational state of a multiple-component software system, the multiple component software system comprising a current configuration;
   in response to determining the operational state as working:
   searching for a configuration matching the current configuration in a configuration database;
   in response to finding the configuration, incrementing a counter corresponding to the configuration;
   determining a second operational state of the multiple-component software system;
   in response to determining the second operational state as non-working:
   searching the configuration database to identify one or more configurations based on a configuration distance to the current configuration corresponding to the multiple-component software system;
   ranking the one or more configurations based on the configuration distance; and
   deploying the highest ranked configuration.

2. The method of claim 1, further comprising:
   generating a report indicating the one or more configurations; and rendering the report on an electronic display device.

3. The method of claim 2, further comprising:
   selecting one of the one or more identified configurations;
   identifying one or more configuration components requiring a version change based on the selected configuration; and performing an automatic version change for each of the identified configuration components.

4. The method of claim 1, wherein the ranking is further based on a deployment size.

5. The method of claim 1, wherein the ranking is further based on a version change friction factor.

6. The method of claim 5, wherein the version change friction factor is based on an average downtime value.

7. The method of claim 6, wherein the version change friction factor is further based on an upgrade path.

8. The method of claim 1, further comprising identifying one or more common modifications components.

9. The method of claim 1, wherein the configuration database includes a blockchain, and wherein creating the new record in the configuration database includes adding a record to the blockchain.

10. The method of claim 1, further comprising:
    receiving a proposed configuration; searching the database for the proposed configuration; in response to finding the proposed configuration in the database:
    determining an operational status for the proposed configuration; and
    in response to the operational status being non-working, searching the configuration database to identify one or more configurations based on a configuration distance to a configuration corresponding to the proposed configuration; and including the identified one or more configurations in the report.

11. An electronic computation device comprising:
    a processor;
    a memory coupled to the processor, the memory containing instructions, that when executed by the processor, cause the electronic computation device to: determine an operational state of a multiple-component software system, the multiple component software system comprising a current configuration; in response to determining the operational state as working:
    search for a configuration matching the current configuration in a configuration database;
    in response to finding the configuration, incrementing a counter corresponding to the configuration;
    determine a second operational state of the multiple-component software system; in response to determining the second operational state as non-working: search the configuration database to identify one or more configurations based on a configuration distance to the current configuration corresponding to the multiple component software system;
    compute a rank for the one or more configurations based on the configuration distance; and
    deploy the highest configuration.

12. The electronic computation device of claim 11, wherein the memory further comprises instructions, that when executed by the processor, cause the electronic computation device to:
  generate a report indicating the one or more configurations; and
  render the report on an electronic display device.

13. The electronic computation device of claim 12, wherein the memory further comprises instructions, that when executed by the processor, cause the electronic computation device to:
  select one of the one or more identified configurations;
  identify one or more configuration components requiring a version change based on the selected configuration; and
perform an automatic version change for each of the identified configuration components.

14. The electronic computation device of claim 11, wherein the memory further comprises instructions, that when executed by the processor, cause the electronic computation device to compute the rank based on information including a deployment size.

15. The electronic computation device of claim 11, wherein the memory further comprises instructions, that when executed by the processor, cause the electronic computation device to compute the rank based on information including a version change friction factor.

16. The electronic computation device of claim 15, wherein the memory further comprises instructions, that when executed by the processor, cause the electronic computation device to compute the version change friction factor based on information including an average downtime value.

17. The electronic computation device of claim 16, wherein the memory further comprises instructions, that when executed by the processor, cause the electronic computation device to compute the version change friction factor based on information including an upgrade path.

18. A computer program product for an electronic computation device comprising a computer readable storage medium having program instructions embodied therewith, the program instructions executable by a processor to cause the electronic computation device to:
  determine an operational state of a multiple-component software system, the multiple component software system comprising a current configuration; in response to determining the operational state as working:
  search for a configuration matching the current configuration in a configuration database;
  in response to finding the configuration, increment a counter corresponding to the configuration;
  determine a second operational state of the multiple-component software system;
  in response to determining the second operational state as non-working:
  search the configuration database to identify one or more configurations based on a configuration distance to the current configuration corresponding to the multiple-component software system;
  rank the one or more configurations based on the configuration distance; and
  deploy the highest ranked configuration.

19. The computer program product of claim 18, further including program instructions, that when executed by the processor, cause the electronic computation device to:
  generate a report indicating the one or more configurations; and
  render the report on an electronic display device.

20. The computer program product of claim 19, further including program instructions, that when executed by the processor, cause the electronic computation device to:
  in response to determining the operational state as non-working: select one of the one or more identified configurations; identify one or more configuration components requiring a version change based on the selected configuration; and perform an automatic version change for each of the identified configuration components.

* * * * *